April 12, 1932.   W. EISENSCHMID ET AL   1,853,555
METER OPERATING MECHANISM
Filed July 24, 1930   5 Sheets-Sheet 3

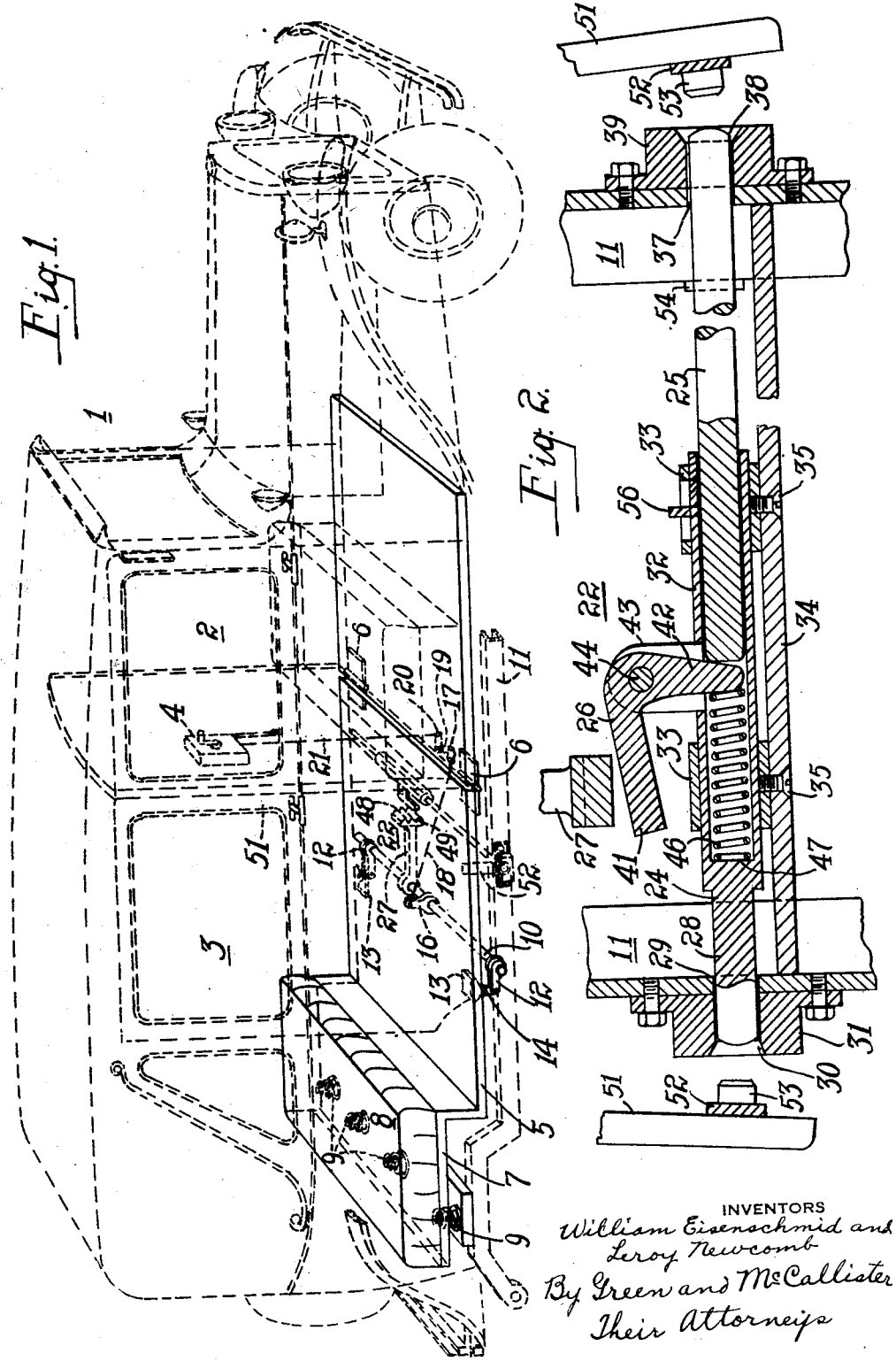

INVENTORS
William Eisenschmid and
Leroy Newcomb
By Green & McCallister
Their Attorneys

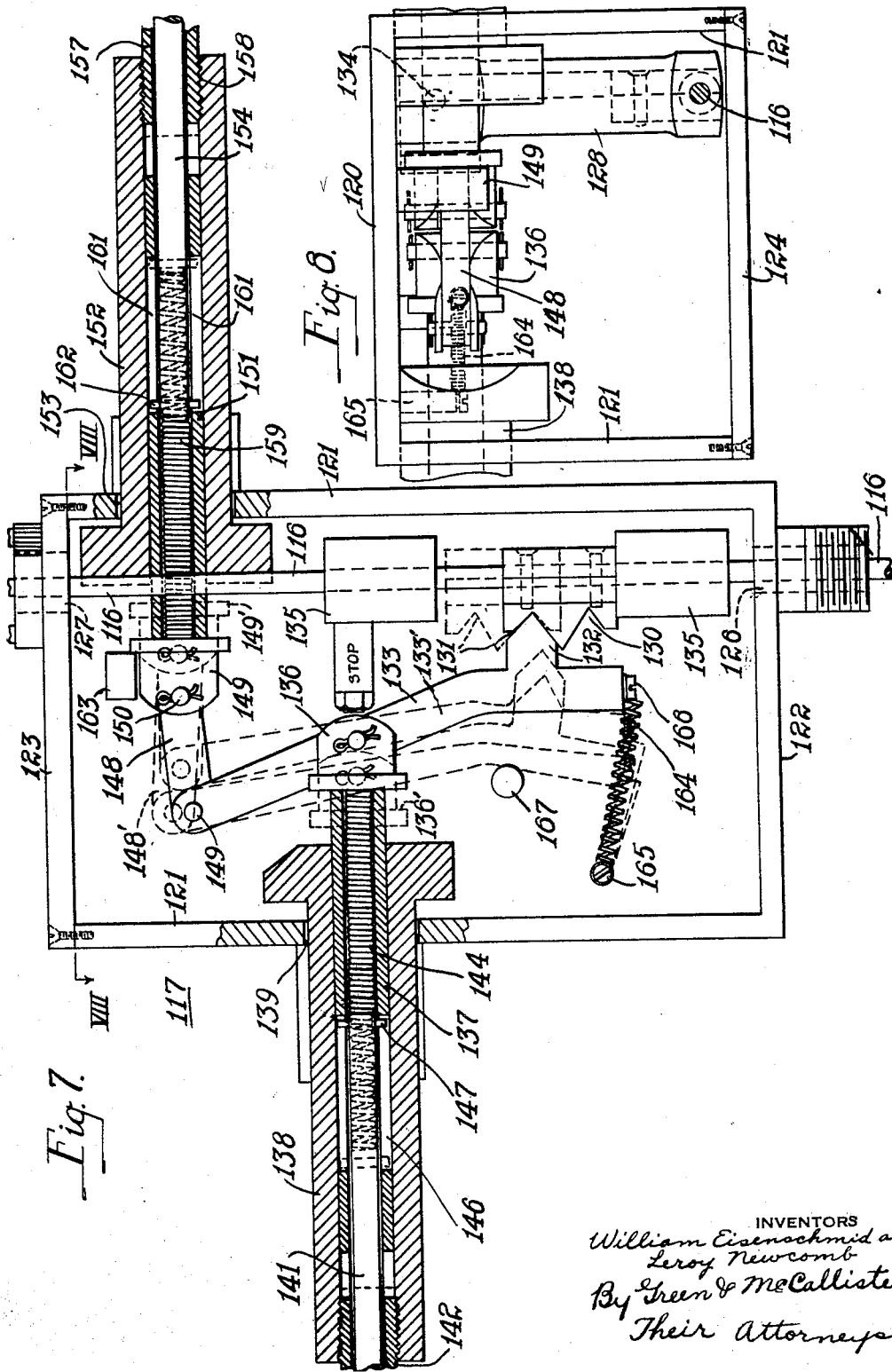

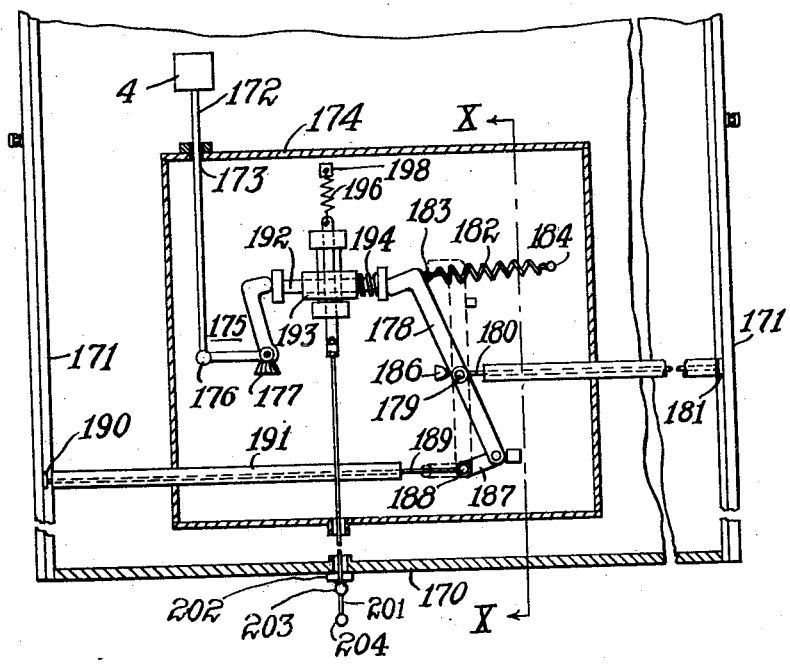
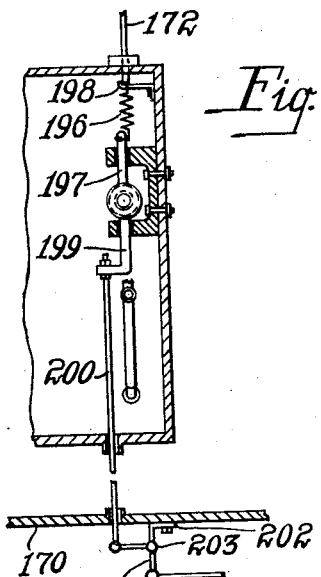

Patented Apr. 12, 1932

1,853,555

UNITED STATES PATENT OFFICE

WILLIAM EISENSCHMID AND LEROY NEWCOMB, OF PITTSBURGH, PENNSYLVANIA, ASSIGNORS, BY DIRECT AND MESNE ASSIGNMENTS, OF ONE-HALF TO PITTSBURGH TAXIMETER COMPANY, OF PITTSBURGH, PENNSYLVANIA, A CORPORATION OF PENNSYLVANIA, AND ONE-HALF TO THE CHECKER CAB MANUFACTURING COMPANY, OF KALAMAZOO, MICHIGAN

METER OPERATING MECHANISM

Application filed July 24, 1930. Serial No. 470,382.

This invention relates to vehicles for hire and more particularly to means for controlling the operation of tariff meters employed in such vehicles.

Heretofore, vehicles for hire, such as taxicabs for example, have been provided with tariff meters for registering the tariff or money due for the hire of such vehicles. Meters of the type now in use and as used heretofore, are under the control of the drivers or chauffeurs and they may, at their pleasure, cause the meters to operate so as to register the fare due for the hire of the vehicles, or they may neglect to start or cause the meter mechanism to register when the cabs or vehicles are in use for hire. For this reason taxi-cab companies or persons operating vehicles for hire, have been deprived of the revenue which is rightfully theirs but which never appears in the registering mechanism of the meters.

An object of this invention is to so control the operation of meters employed in vehicles for hire, that the drivers or chauffeurs cannot prevent such meters from registering when the vehicles are occupied, carrying passengers or loads for hire.

Another object of the invention is to so control the operation of meters of the type referred to above that operation of such meters shall be initiated automatically when such vehicles are occupied either by a passenger or passengers or a pay load for hire.

A further object of the invention is the provision of means for locking meters employed in vehicles for hire, either in a tariff registering position when such vehicles are occupied, or in a no-tariff registering position when vacant.

Other objects of the invention will, in part, be apparent, and will, in part, be obvious from the following description taken in conjunction with the accompanying drawings, in which:

Figure 1 is a phantom view in perspective of a vehicle, such as a taxi-cab, having apparatus, arranged and constructed in accordance with the invention, embodied therein for controlling the operation of the tariff or taximeter;

Fig. 2 is a partial view in section of the side frame members of the cab chassis and a locking mechanism for locking the mechanism controlling the operation of the meter either in a tariff or a no-tariff registering position;

Fig. 7 is a front view partially in section of a meter locking mechanism, the location of which is illustrated generally in Figs. 5 and 6;

Fig. 8 is a top plan view of the device shown in Fig. 7 as viewed from above a plane along lines VIII—VIII of Fig. 7;

Fig. 9 is a front plan view of a modified form of meter locking mechanism mounted in place in the driver's or chauffeur's compartment of a cab or vehicle; and Fig. 10 is a view in section taken on line X—X of Fig. 9.

Throughout the drawings and the specification like reference characters indicate like parts.

Figure 3:
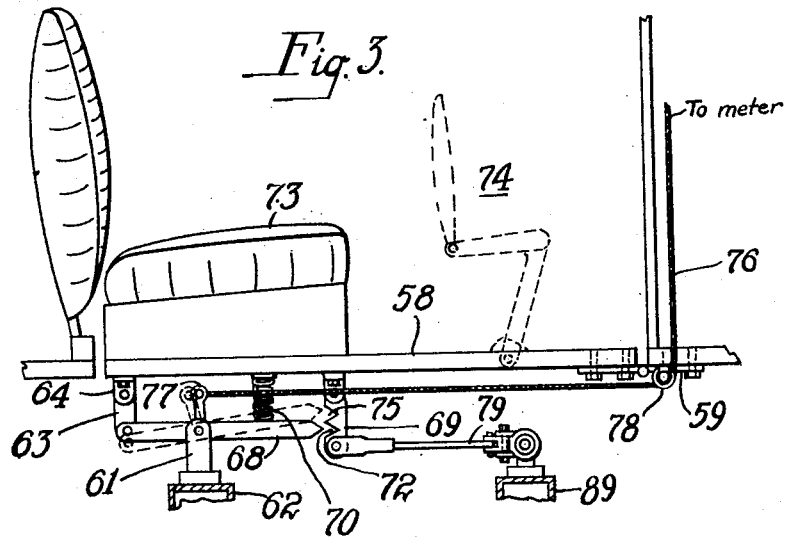
Fig. 3 is a partial schematic view of a vehicle compartment having a modified form of the invention embodied therein.

In order to illustrate the forms and constructions of the embodiments of the invention, the invention is illustrated in conjunction with a taxi-cab or vehicle, such as is available to the public for hire. While the invention is shown and described in conjunction with a taxi-cab or vehicle, it is to be understood that the invention is applicable to other types of vehicles and may be applied to aeroplanes where such type of vehicle is employed to transport passengers and loads for hire.

In Fig. 1 of the drawings, a taxi-cab or vehicle designated generally by the reference character 1 is shown. The taxi-cab 1 is provided with the usual driver's or chauffeur's cab or compartment 2 and a compartment 3 in which passengers, goods, packages and the like may be transported for hire.

The taxi-cab 1 is provided with the usual meter 4 for registering the tariff or charge to be made for transporting passengers, goods, packages and the like from one destination to another. In order to insure that the meter 4 shall start or begin to register the tariff or charge the moment a passenger or other load is placed in the compartment 3, a movable floor or platform 5 is provided in the compartment 3. The movable floor or platform 5 is pivotally mounted on hinges 6 attached to the underside of the body. The rear end of the platform 5 terminates in an elevated or raised shelf 7 upon which a seat cushion 8 is mounted. The shelf or platform 7 is yieldingly mounted on springs 9.

The springs 9 are so designed that the movable platform 5 is biased or urged towards a no-load position, this being a position in which the platform or floor 5 will normally occupy when the cab is vacant.

When a passenger enters the compartment 3 of the cab, or a load in the form of goods, baggage or the like is placed in this compartment, the springs 9 will be compressed thereby permitting the floor or platform 5 to lower. In order to utilize such movement or lowering of the floor or platform 5 to control the operation of meter 4, a shaft 10 is provided, the ends of which are journalled in channel members 11 which form the side frame members of the cab chassis.

The shaft 10 is provided with cranks or levers 12 fixedly mounted thereon adjacent to the opposite ends of the shaft. The cranks or levers 12 are mechanically connected to brackets 13 secured to the underside of the platform 5 by means of links 14. The links 14 are pivotally connected to the brackets 13 and the arms or cranks 12. The shaft 10 is provided also with a crank or arm 16 fixedly mounted thereon. Crank or arm 16 is connected to a depending arm 17 of a bell crank by means of a rod or link 18.

The bell crank of which the depending arm 17 forms a part may be pivotally mounted as at 19 on the underside of the cab body and at a point approximately vertically or directly below the meter 4. A horizontally extending arm 20 of the bell crank is mechanically connected to the meter mechanism of meter 4 by means of a rod or link 21.

As the meter 4 forms no part of the invention except that it enters into the combination by reason of its being operated upon by the mechanism actuated and controlled by movements of the floor or platform 5, the details of construction of the meter need not be shown or described in detail. The type of meter 4 employed, however, is one in which the meter registering mechanism is operated by clock work. As is well known in the art, meters of the type herein referred to may be started and stopped at will by means of brakes or catches; such brakes or catches when released permit the clock work to operate the meter mechanism and when applied cause the meter mechanism and the clock work to stop. Throughout the specification it will be understood that when reference is made to the starting and stopping of the clock work which operates the meter registering mechanism of the meter 4, the rod or shaft 21 is attached to the brake or latch mechanism which controls the starting and stopping of the clock work in the meter.

When a passenger enters the compartment 3 of the cab and his weight is imposed on the floor or platform 5, the springs 9 will yield or compress so that the floor or platform will lower, that is, the floor will turn or pivot on the hinges 6. Such lowering of the floor or platform 5 will be transmitted through the links 14 to the cranks or arms 12 whereby the shaft 10 will be caused to turn in a counter-clockwise direction as viewed from Fig. 1. The turning of the shaft 10 in this direction will cause the crank or arm 16 to turn in the same direction. Since the arm or crank 16 is connected by shaft or link 18 to the arm 17 of the bell crank, the bell crank will turn in a clockwise direction thereby pulling or moving the shaft or link 21 downwardly. Such downward movement of the shaft 21 will cause the clockwork of the meter to be released so that it will operate to drive the tariff registering mechanism of the meter.

So long as the passenger or a load remains within the compartment 3, the meter 4 will continue to operate and to register the tariff or charge due for transporting such passenger or load. However, when the passenger leaves the cab or the load is removed, the springs 9 will move the floor upwardly to its normal or no-load position. Such movement of the floor is transmitted to the bell crank by means of the links 14, cranks 12, shaft 10, crank 16 and rod 18. Since the upward movement of the floor or platform 5 operates upon the bell crank in the opposite direction when the floor is moved to its no-load position, it follows that the bell crank will turn in a counter-clockwise direction whereupon the shaft or rod 21 is moved upwardly. Such upward movement of the rod or link 21 is utilized to stop the clock work mechanism of the meter so that no further registering of tariff or charge is permitted to take place when the cab is vacant.

Since the floor or platform 5 is mounted on hinges 6 at one end and on springs at the other end, it follows that the floor or platform could move up and down to start and stop the meter intermittently while the cab is traveling over rough or bumpy streets and highways. Such action of the floor or platform 5 may take place even though the cab is occupied or vacant. In order to prevent such untimely movements of the floor or platform 5, a locking device 22 is provided for locking the floor or platform 5 in a no-load position when the compartment 3 of the cab is vacant and in a lowered or occupied position when a passenger or load is in the compartment and being transported from one place to another. By providing such a locking mechanism, the cab driver or chauffeur is protected against charges being made against him while cruising or driving the vehicle without any passengers or load within the compartment. Likewise, the cab company or owners are protected because the meter 4 will register the fare or charge due for transporting a passenger or load.

The locking mechanism 22 is shown more particularly in Fig. 2 of the drawings and comprises a plunger 24, a plunger 25, a latch 26 and a latch keeper 27.

The plunger 24 has an end portion 28 extending through an opening 29 in the web of the channel 11 and into an aperture 30 formed in a boss or bracket 31 which is secured to the outer face of the web of the channel or frame member 11. The plunger 24 is provided also with a cylindrical sleeve 32 which is slidably mounted in collars 33 attached to a cross beam 34 by means of screws 35 or other suitable means. The cross beam 34 may be mounted on and secured to the frame members 11 of the chassis. The plunger 25 may be constructed of a rod or bar of such size and shape that its inner end may be movably disposed within the cylindrical sleeve 32 of the plunger 24. The outer end of plunger 25 extends through an opening or aperture 37 in the web of the chassis frame member 11. The extreme outer end of the plunger 25 is disposed within an aperture or passageway 38 formed in a bushing 39 similar to bushing or boss 31. Bushing or boss 39 is secured to the outer face of the side frame member 11 of the chassis.

As shown in Fig. 2, the latch 26 is angular in form and comprises arms 41 and 42 disposed at substantially right angles to each other. The latch 26 is pivotally mounted on a bracket 43 by means of a pin or bolt 44 passing through the latch and the bracket. The bracket 43 is formed preferably as an integral part of the sleeve 32.

The arm 42 of the latch 26 extends into the sleeve or cylinder 32 and is held yieldingly in engagement with the inner end of plunger 25 by means of a compression spring 46 disposed within the sleeve and having one end thereof resting against bottom 47 of the passageway formed within the sleeve 32.

The latch 26 when operated or turned about the pin or bolt 44 as a pivot engages in one or another of recesses 48 and 49 formed in the end of the latch keeper 27. The latch keeper 27 is fixedly secured or attached to the shaft 10 so that it will turn with the shaft in a counter-clockwise direction when a passenger or load is within the compartment 3 or in a clockwise direction when the compartment is vacant.

If the compartment is vacant, the latch keeper 27 will be turned to such a position that the recess 48 is opposite the arm 41 of latch 26 and in alinement therewith. Therefore, as will be subsequently described, when the doors are closed the latch 26 will turn to such a position that the arm 41 registers in the recess 48. When the arm 41 of the latch engages the recess 48, movement of the floor or platform 5 is prevented because the shaft 10 is locked so as to prevent its turning even though the vehicle is traveling over rough or bumpy streets or highways.

When a passenger or a load occupies the compartment 3, the shaft 10 will turn, as previously described herein, to such a position that the recess 49 in the latch keeper 27 will be opposite and in alinement with the arm 41 of the latch 26. Upon the closing of the doors of the cab, the arm 41 of the latch 26 will turn to such a position that it will register in the recess 49 and thereby lock the floor or platform 5 in its load or occupied position. Since the floor is locked in this position when the compartment 3 is occupied, the meter 4 will continue to register without interruption so long as the compartment is occupied.

The doors for the compartment 3 of the cab are designated in Fig. 2 by reference characters 51. The bottom of doors 51 are provided with fingers or depending arms 52 to which are attached lugs or bosses 53. The position of the depending fingers or brackets 52 is such that when the doors 51 are closed, the bosses or lugs 53 will enter recesses or apertures 30 and 38 in the bosses 31 and 39 and engage the outer ends of the plungers 24 and 25, and the plunger 25 will move inwardly towards the center of the cab. Likewise the plunger 24 will move inwardly so that the result is that the plunger 25 moves within the sleeve 32. Since, when both doors are closed, the plungers 24 and 25 move inwardly towards each other, it follows that the plunger 25 will be stationary when the door operating upon it is closed, and will, therefore, act as a stop for the latch 26. Since the latch 26 is moved bodily with the plunger 24, it follows that the latch 26 must turn in a clockwise direction as viewed from Fig. 2 in order to permit the plunger 24 to move inwardly when the door 51 operating upon it is closed.

Since the latch 26 yieldingly operates against the spring 47, arm 41 of the latch may be disengaged from the latch keeper 27 by opening either one or both of the doors 51. If, for example, the door 51 operating upon the outer end of plunger 25 is open while the door operating on the outer end of plunger 24 is closed, the spring 46 will cause the latch 26 to turn in a counter-clockwise direction and thereby push the plunger 25 outwardly to the position shown in Fig. 2. In this position, the arm 41 of the latch is disengaged from the latch keeper 27. The outward movement of the plunger 25 is limited to the position shown in Fig. 2 by means of a pin 54 passing through the plunger.

If the door 51 operating upon the outer end of plunger 25 is closed and the door operating upon the outer end of plunger 24 is opened, the spring 46 will cause the plunger 24 to move to the left as viewed from Fig. 2 whereby the latch 26 is carried bodily with it in the same direction. Since the latch 26 is carried bodily to the left along with plunger 24, it follows that the arm 42 tends to be pulled away from the inner end of plunger 25. However, this tendency is offset by the spring 46 which elongates and maintains the arm 42 in contact with the inner end of plunger 25. For this reason the latch 26 will turn in a counter-clockwise direction to the position shown in Fig. 2 in which position the latch is disengaged from the latch keeper 27.

From the above description of the locking mechanism 22 it will be observed that the floor or platform 5 may be locked in either a vacant or a loaded position in response to the closure of both doors 51. It will also be observed that the locking mechainsm will operate to unlock the floor 5 in response to the opening of either one or both of these doors.

In order to prevent the plunger 24 from turning about its longitudinal axis and also to limit its longitudinal movements, a slot is provided in guiding member 33 which is adjacent to the inner end of said plunger. A pin 56 secured to the sleeve 32 extends outwardly through the slot and operates to prevent turning of the plunger about its longitudinal axis and also to limit its longitudinal movements because the pin 56 will bring the plunger 24 to rest when said pin strikes against one or the other of the ends of the slot.

Figure 4:
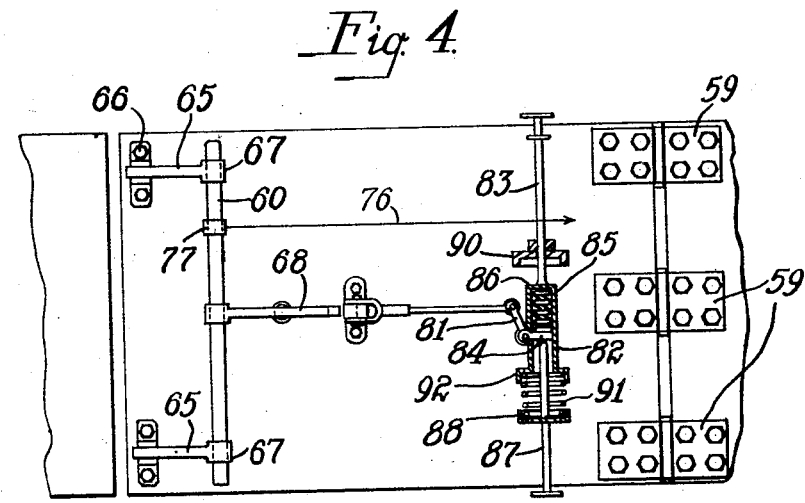
Fig. 4 is a bottom plan view of the apparatus shown in Fig. 3.

In Figs. 3 and 4 of the drawings, a modified form of mechanism is shown for starting and stopping meter 4, depending upon whether a load is carried in compartment 3 of the cab or whether the compartment is vacant, and for locking the floor or platform in either a loaded or vacant position. In Figs. 3 and 4 reference character 58 represents a floor or platform of a compartment such as designated by reference character 3 of Fig. 1 of the drawings. The end of the floor 58 adjacent to the driver's or chauffeur's compartment is pivotally mounted on hinges 59, and the opposite end of the floor is mounted on a shaft 60 which is journalled in uprights or brackets 61 secured to a cross member 62 carried by the side frame members 11 of the chassis. The floor or platform 58 is connected to the shaft 60 by means of the depending links 63 pivotally mounted in brackets 64 at their upper ends and pivotally connected at their lower ends to arms or cranks 65. The brackets 64 are secured to the floor or platform 58 by means of bolts 66 or other suitable means. The arms or cranks 65 are keyed or otherwise secured to the shaft 60 as at 67.

The shaft 60 has secured thereto a latch keeper 68 that operates in conjunction with a latch 69 to lock the floor or platform 58 in either a loaded or vacant position. A compression spring 70 is interposed between the underside of the floor or platform 58 and the upper side of the latch keeper 68. It will be observed in Figs. 3 and 4 that the distance between the point where the compression spring 70 engages the latch keeper 68 and the center line of the shaft 60 is approximately equal to the distance between the pivotal connection of the links 63 to the arms or cranks 65 and the center line of shaft 60. Since the platform or floor 58 is mounted in this manner on the shaft 60 the shaft is counter-balanced so that it will not turn in either direction when the cab is vacant and no pay load is imposed on the floor or platform.

When the cab is vacant the shaft 60 will turn to such a position that the latch keeper occupies substantially a horizontal position, a position indicated in full lines in Fig. 3. In this position the end of the latch keeper 68 adjacent to latch 69 is in alinement with a notch or recess 72 in the latch 69 so that when the latch 69 is swung towards the latch keeper, the latter will register in the notch 72 whereby the shaft 60 is locked and prevented from turning about its longitudinal axis. The floor or platform 58 will therefore be held in a no-load or vacant position even though the cab or vehicle may be driven on rough and bumpy streets and highways.

If a passenger or passengers enters the cab and occupy either or both of seats 73 and 74, the floor or platform 58 will move downwardly thereby causing the shaft 60 to turn in a counter-clockwise direction. By so turning, the latch keeper 68 will occupy the broken line position indicated in Fig. 3, in which position its free end will be in alinement with a notch or recess 75 in the latch 69. By causing the latch 69 to swing into position to engage the free end of latch keeper 68, the floor or platform will be locked in a loaded or occupied position.

The starting and stopping of meter 4 shown in Fig. 1 of the drawings in response to downward and upward movements of the floor or platform 58 may be effected by means of a cable 76 one end of which is attached to the mechanism controlling the starting and stopping of the meter and the other end of which is connected to an arm or crank 77 secured to shaft 60. The cable 76 operates over a pulley 78 attached to the underside of the cab body as shown in Fig. 3. When a load or passenger enters the cab the floor will lower, as stated heretofore, and cause the arm or crank 77 to turn to the position indicated in broken lines in Fig. 3. By moving to this position the cable 76 is so moved that the meter clock mechanism is released to starting position and when the floor or platform 58 is vacant and occupying the position shown in Fig. 3, the cable 76 will move in the opposite direction and effect stopping of the clockwork mechanism of the meter.

The latch 69 operates in substantially the same manner as the latch 26 shown in Figs. 1 and 2 and by substantially the same operating mechanism. The lower end of latch 69 is pivotally connected to a connecting link 79 which in turn is connected to a bell crank 81. The bell crank 81 is pivotally mounted on a cylindrical sleeve 82 which carries an extension rod 83 that extends outwardly to the side of the cab and directly below the door thereof. An arm 84 of the bell crank 81 extends into the cylindrical sleeve 82. A coil spring 85 is disposed between one side of the arm 84 and a bottom wall 86 of the sleeve 82. A plunger 87 operates in conjunction with plunger 83 and has one end thereof engaging the arm 84 of bell crank 81. The other end of plunger 87 extends outwardly to the side of the cab and directly below the door in that side. Plunger 87 is movably disposed and guided in a bracket 88 carried by a cross-frame member 89 which is carried by the side frame members 11 of the chassis. Likewise, the extension 83 of the sleeve 82 is movably disposed and guided in a similar bracket 90 carried by the cross-frame member 89. Longitudinal movement of the cylindrical sleeve 82 is opposed by a compression spring 91 disposed about the plunger 87 and between bracket 88 and flanged end portion 92 of the sleeve 82.

When both doors of the cab are closed, the plunger 87 and the cylindrical sleeve 82 will be moved towards each other in the manner set forth in connection with the description of operation of the locking mechanism 22 in Fig. 2 of the drawings. When so moving, the bell crank 81 will turn in a counter-clockwise direction as viewed from Fig. 4 and cause the latch to engage the latch keeper 68 whereby the floor 58 will be locked in one or the other of its positions depending upon the position of the latch keeper.

If both doors are closed, the floor 58 will be locked in one or the other of its positions as stated above. However, if either one or both of the doors are opened, the bell crank 81 will turn in a clockwise direction as viewed from Fig. 4 and cause the latch 69 to become disengaged from the latch keeper 68. When so disengaged and a passenger leaves the cab or a load is removed therefrom, the floor will raise and thereby cause the meter to stop. Also, if a passenger should enter the cab at this time, the floor will lower to start the meter, and upon closure of the doors the floor will be locked in this position and thereby cause the meter to operate and register the fare due so long as the passenger remains in the cab.

Figure 5:
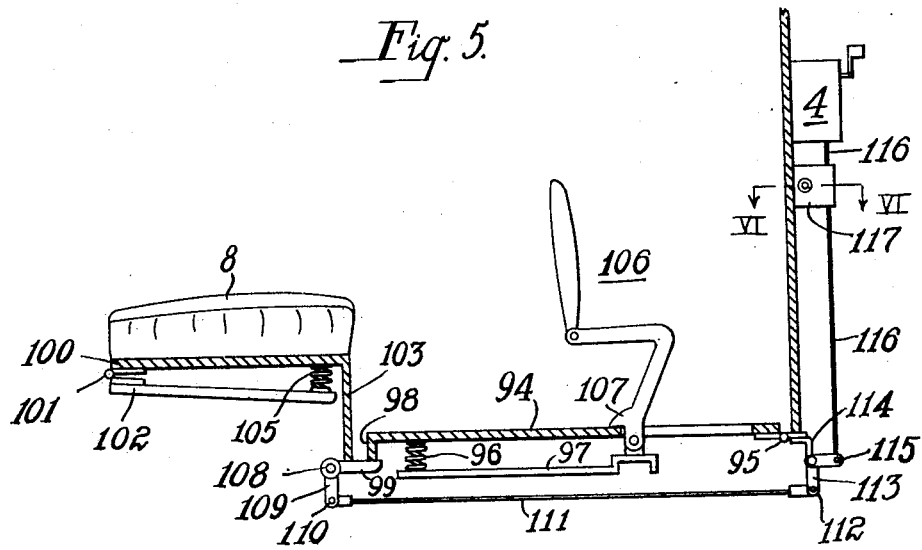
Fig. 5 is a view similar to Figs. 3 and 4 illustrating another modified form or embodiment of the invention.
Figure 6:
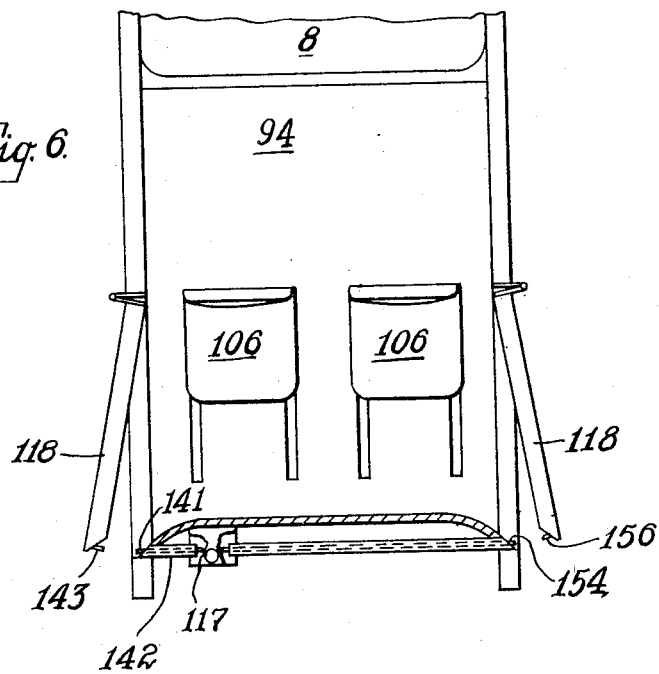
Fig. 6 is a top plan view of the apparatus shown in Fig. 5, a portion thereof being in section taken on line VI—VI of Fig. 5.

In Figs. 5 and 6 of the drawings, a further modified form of mechanism for starting and stopping the meter 4 and for locking the meter either in a fare-registering position or in a non-fare-registering position depending upon whether the cab is occupied or vacant, is illustrated.

With reference to Figs. 5 and 6, reference character 94 represents the floor or platform of the tariff compartment of a vehicle such as compartment 3 of Fig. 1 of the drawings. Floor 94 is hinged at its forward end on hinges 95 and is yieldingly supported at its rear end on springs 96 carried by an under-support 97, which it will be understood, is secured to and carried by the frame members of the chassis. The extreme rear end of the floor or platform 94 has a depending portion 98 that bears upon a horizontally extending arm 99 of a bell crank. In the structure shown in Fig. 5, the seat cushion 8 of Fig. 1 is carried or mounted on a platform 100 which is hinged at 101 to a stationary platform 102. The stationary platform 102, it will be understood, is secured to the body of the cab or it may be secured to the side frame members 11 of the chassis. The forward end of the platform 100 is provided with a depending wall or partition 103, the lower end of which rests upon the horizontally extending arm 99 of the bell crank.

Pivotal movement of the platform 100 is yieldingly opposed in a downward direction by a coil spring 105. Coil spring 105 operates to normally bias or urge the seat 8 towards a vacant or no-load position; likewise, the spring 96 operates to normally bias or urge the floor or platform 94 towards a no-load or vacant position. As is usual practice in vehicles such as taxi-cabs, auxiliary folding seats 106 are provided for carrying extra passengers. The seat 106, as shown in Fig. 5, is pivotally mounted on the under platform 97. In order that the seat 106 may be utilized to depress the floor 94 when occupied by a passenger, the seat is provided with a lug 107 that engages the floor. The weight of a passenger occupying seat 106 will cause the floor to move downwardly and thereby turn the bell crank in a counter-clockwise direction. The same operation takes place if a passenger should occupy seat 8.

The bell crank may be pivotally mounted as indicated at 108. In order that turning movement of the bell crank may be utilized to start and stop the meter 4, a depending arm 109 of the bell crank is pivotally connected as at 110 to a rod 111 which in turn is pivotally connected as at 112 to a depending arm 113 of a bell crank. The bell crank is pivotally mounted on a bracket 114. A horizontally extending arm 115 of the bell crank is connected by a rod or link 116 the upper end of which is connected to the mechanism that starts and stops the clockwork of the meter.

In order to insure that the meter 4 will be locked in either a fare-registering position, when the cab is occupied, or a non-fare-registering position when the cab is vacant, a locking device 117 is provided. Locking device 117 is mounted preferably directly below the meter 4 in the chauffeur's or driver's compartment and is so designed that it shall be under the control of doors 118 and arranged to lock the rod 116 in a fixed position depending upon whether the cab is occupied or vacant.

The locking device 117 is illustrated schematically in Figs. 5 and 6 merely to show its location with respect to the meter 4 and the doors 118. The details of construction and arrangement of parts of the locking device 117 is shown more particularly in Figs. 7 and 8 of the drawings.

The locking device 117 comprises a casing having a back wall 120, side walls 121, a bottom wall 122, a top cover plate 123, which is removable, and a front removable cover plate 124. The bottom cover plate 122 has an opening 126 through which the rod or link 116 extends, and an opening 127 from which the rod 116 emerges and extends upwardly to the meter 4.

The rod 116 carries a latch keeper 128, the outer end of which is clamped to the rod 116. The inner end of the latch keeper 128 is provided with notches 130 and 131 for the reception of a dog or projection 132 forming part of a latch keeper 133. The inner end of latch 128 is guided in its upward and downward movements by means of a pin 134 secured to the latch. The pin 134 operates in guideways formed in blocks 135 that are secured to the back wall 120. The blocks 135 are spaced apart so as to permit the latch 128 to move the necessary distance to permit the dog 132 to register in one or the other of the notches 130 and 131.

The latch keeper 133 is pivotally mounted in a bifurcated portion 136 forming part of a cylindrical sleeve 137. The sleeve 137 is disposed with a conduit 138 extending into the casing through an opening 139 in the side wall 121. The sleeve 137 may be moved inwardly into the casing to the position shown in full lines by means of a rod or plunger 141. Rod or plunger 141 is disposed within a conduit 142 which has screw-thread engagement with the outer end of the conduit 138. The outer end of rod or plunger 141 terminates at the front edge of the door so as to be engaged by a lug or projection 143 carried by the door when the door is closed. When the door 118 is closed, the lug 143 will push the plunger 141 inwardly against the force of a spring 144 disposed within the sleeve 137 and between the bifurcated portion 136 and the inner end of the plunger 141. As shown in Fig. 7, the sleeve 137 has a slot 146 along which a key or pin 147 extending through the inner end of the rod 141 may move. The key or pin 147 permits relative movement between the sleeve 137 and the rod or plunger 141.

The upper end of latch 133 has a link 148 pivotally connected thereto as at 149. The opposite end of link 148 is pivotally connected to a bifurcated portion 149, as at 150, forming the inner part of a sleeve 151. It will be observed that the bifurcated portion 149 and the sleeve 151 is substantially similar to the bifurcated portion 136 of the sleeve 137. Sleeve 151 operates within a conduit 152 that extends into the casing through an opening 153 in side wall 121. A rod or plunger 154 is disposed within the sleeve 151. This rod extends to the margin of door 118 located on the right side of the cab body as viewed from Fig. 6 so as to be engaged by a lug 156 carried by the door. The plunger 154 operates within a conduit 157 attached to the conduit 152 as at 158.

The inner end of plunger 154 operates against compression spring 159 disposed between the bifurcated portion 149 and the inner end of the plunger, the spring being located within the sleeve 151. The sleeve 151 is provided with a slot 161 along which a pin 162 extending through the inner end of plunger 154 may move as the plunger moves inwardly and outwardly. The inward movement of the plunger 151 is limited by a stop 163 secured to the back wall 120 of the casing.

The lower end of latch keeper 133 operates against a tension spring 164, one end of which is secured to the back wall 120 of the casing as at 165 and the other end of which is secured to the latch as at 166. The spring 164 tends to pull the lower end of latch keeper 133 to the left as viewed from Fig. 7. The movement of the latch in this direction may be limited by means of a stop 167 secured to the back wall 120 of the casing.

The construction of the locking mechanism shown in Figs. 7 and 8 is such that the dog or projection 132 will not engage the notches in the latch 128 unless both doors 118 of the cab are closed. Also the construction and arrangement of parts is such that the dog or projection 132 will be disengaged from the notches in the latch 128 if one or both of the doors 118 are opened.

If both doors of the cab are closed, the dog 132 of latch keeper 133 will engage one or the other of notches 130 and 131 as shown in Fig. 7 of the drawings depending upon whether the cab is vacant or occupied. It will be observed by reference to Fig. 5 that the levers 113 and 115 of the bell crank operating upon rod 116 will turn in a clockwise direction when the cab is occupied. For this reason the dog 132 of latch keeper 133 will engage notch 131 of latch 128 when the cab is occupied, and this locking position of the locking mechanism is indicated in full lines in Fig. 7.

If the cab is vacant and both doors are closed, the latch 128 will occupy the elevated position indicated in broken lines in Fig. 7, and in this position the dog 132 will register in the notch 130 of the latch and thereby lock the meter 4 in its non-fare-registering position; that is, when the cab is running vacant.

If the door operating on plunger 154 is held closed and the door operating on plunger 141 is opened, the spring 164 becomes operative to pull the lower end of latch keeper 133 to a position indicated in broken lines in Fig. 7 and in which position the keeper is held against stop 167. By moving to this position, the sleeve 137 is moved to a position indicated by reference character 136' and link 148 will swing upwardly to the position indicated by reference character 148'. If the door operating on plunger 141 is closed and the door operating on plunger 154 is opened, the sleeve 151 will be moved, to the position indicated in broken lines by reference character 149', by the spring 164 which causes the latch keeper 133 to turn on its pivotal support on the bifurcated portion 136 of the sleeve 137. When in this position the latch keeper will occupy the position indicated by broken lines 133' and as is clearly shown in Fig. 7, the meter 4 will be unlocked.

From the above description, it will be observed that both doors must be closed in order to lock the meter in either a fare-registering position or in a vacant or no-tariff registering position. Otherwise if either one or both of the doors are open, the locking device will permit the meter to be started or stopped according to whether passengers or a pay load are occupying the tariff compartment of the cab.

In the construction and operation of the locking device as disclosed in the drawings and particularly as disclosed in Figs. 5 to 8, it will be understood that the rod 116 will be enclosed in a conduit, for example, such as conduits 142 and 147, in order to prevent the chauffeur or driver from controlling the operation of the meter so as to thereby cause it to register incorrectly the true value or amount of the tariff derived from hauling or transporting passengers or pay loads.

Since the plungers 154 and 141 are enclosed and also since the working parts of the locking device within the casing are enclosed, it will be difficult for the chauffeurs or drivers of vehicles for hire to control the amount of tariff which the meters will register without damaging or destroying the casing and the mechanism therein. However, if this be done such acts of tampering may readily be detected.

In Figs. 9 and 10 of the drawings, a still further modified form of mechanism for controlling the operation of meter 4 is disclosed. Fig. 9 represents a fragmentary view, of a cab, in section taken on a vertical plane passing through the driver's compartment of the cab shown in Fig. 1 and in front of meter 4. In Fig. 9 reference character 170 indicates the floor of the cab in the driver's compartment and reference characters 171 designate the doors of the passenger compartment. The meter 4 of the cab is controlled by a rod or shaft 172, the lower end of which extends through an opening 173 in wall 174 of a casing, and is pivotally connected to a bell crank 175 as at 176. Bell crank 175 is pivotally mounted on a fixed support as at 177 to the back wall of the casing.

A lever 178 is disposed within the casing and is pivotally mounted medially of its ends as at 179 on a rod or plunger 180, the outer end of which terminates at the margin of the door 171 as indicated at 181. The upper end of lever 178 operates against a tension spring 182 attached thereto as at 183. The opposite end of the spring 182 is secured or anchored to the back wall of the casing as at 184. The inward movement of the lever 178 is limited by a stop 186 secured to the back wall of the casing.

The lower end of lever 178 is pivotally connected to a link 187 which in turn is pivotally connected as at 188 to a plunger 189, the outer end of which terminates at the margin of door 171 as indicated at 190. Plunger 189 operates within a conduit 191 that extends from the margin of the door through a side wall of the casing as shown in Fig. 9. Interposed between the upper ends of bell crank 175 and lever 178 is a plunger 192 slidably disposed within a sleeve 193. The plunger 192 is biased towards the right as viewed from Fig. 9 by means of a compression spring 194 located between the cylinder or sleeve 193 and the end of plunger 192 which is adjacent to the uppermost end of lever 178.

The sleeve or cylinder 193 is biased towards the top wall 174 of the casing by means of a tension spring 196 attached to the outer end of an extension arm 197 attached to the sleeve or cylinder. Spring 196 is suspended from a bracket 198 secured to the back wall of the casing as shown in Fig. 10. The lowermost side of the cylinder or sleeve 193 carries an L-shape extension 199 to the lower end of which is attached a rod 200. The lower end of rod 200 is attached to a bell crank 201 carried by a bracket 202 secured to the underside of the cab floor, the bell crank being pivotally mounted on said bracket as at 203. The bell crank 201 may be operated by a rod 204 corresponding to rod 111 shown in Fig. 5 of the drawings.

It is to be understood that the mechanism shown in Figs. 9 and 10 may be operated by the pivotally mounted floor and seat construction shown in Fig. 5 of the drawings. Therefore, means for operating the mechanism shown in Figs. 9 and 10 have not been duplicated. When a passenger enters a cab and the arrangement shown in Figs. 9 and 10 are embodied to control the meter, the downward movement of the floor will cause the sleeve 193 to be moved to the position shown in Fig. 9 of the drawings. Upon the closure of the doors, the lever 178 will be actuated to the position shown in full lines whereby the bell crank 175 will be caused to turn in a counter-clockwise direction to trip the clockwork mechanism and cause it to operate the registering mechanism of the meter 4. If the cab is vacant, the floor or platform, such as shown in Fig. 5, will move upwardly to permit the sleeve or cylinder 193 to be pulled upwardly by spring 196 to a position in which it will not be engaged by the lever 178. Therefore, upon the closure of the doors, the lever 178 will occupy the position shown in full lines in Fig. 9, but since the plunger 192 will be out of position, the meter mechanism cannot be started as the bell crank 175 will not be turned on its pivot even though the doors are closed.

If the door operating on plunger 189 is closed and the other door is open, the lever 178 will assume the position shown in broken lines in Fig. 9, and it will assume or occupy substantially the same position, even though door 171 operating on plunger 180 is closed and the other door is open. It, therefore, follows that if one or both doors are open the meter cannot be tripped free by the rod 172.

While various embodiments of the invention have been disclosed, it will be understood that such disclosures are merely illustrative of various forms which the invention may take.

The invention as disclosed in the several embodiments thereof is such that it responds to the presence of a pay load, such as passengers, articles, packages and the like within the tariff compartment of a vehicle for hire. The mechanism responsive to such weight within the tariff compartment is utilized to start the meter mechanism so as to register and record the tariff or charge, the moment such weight or pay load is within the tariff compartment. While the mechanism employed and disclosed is mechanical throughout, it is to be understood that the weight responsive mechanism may be utilized to operate upon electrical, pneumatic or hydraulic instrumentalities which are utilized and directly connected to and operate upon the meter mechanism so as to control its starting and stopping operations in response to certain conditions, namely, whether the cab or vehicle is vacant or occupied.

Having thus described the invention, it is to be understood that various modifications and changes may be made without departing from the spirit and the scope thereof. It is, therefore, desired that only such limitations shall be placed on the invention as are imposed by the prior art and the appended claims.

What we claim as new and desire to secure by Letters Patent is:

1. In combination with a vehicle having a compartment in which to carry a pay or tariff load, a door for said compartment and a meter for recording the tariff due for transporting said load, of means responsive to the weight of the load in said compartment for causing said meter to register the tariff due, and means controlled by the closing of said door for locking said meter in registering condition.

2. In combination with a vehicle having a compartment in which to carry passengers or load for hire, a door for said compartment and a meter for registering the tariff due for transporting said passengers or load, of a movable floor in said compartment, means yieldingly urging said floor towards a predetermined position, means operable by movement of said floor against the force of said yielding means for causing said meter to operate and register the tariff due in response to a passenger or pay load entering upon said floor, and means controlled by the closing of said door for locking the meter while operating to register said tariff.

3. In combination with a passenger vehicle having a tariff load compartment, a door for said compartment and a tariff registering meter, of means responsive to a predetermined load placed in the tariff load compartment of said vehicle for causing said meter to register and means operated by the closure of said door for locking said meter in tariff registering position while said load is within the tariff load compartment.

4. In a vehicle having a compartment in which to carry a tariff load, doors for the compartment, and a meter for registering the tariff due for transporting a load in the compartment, of a movable floor in said compartment, means responsive to a load placed on said floor to cause said meter to register and means operated by the closing of said doors for locking said meter in tariff registering position.

5. In a vehicle for transporting passengers or loads for hire, a meter for registering the tariff due for such transportation, and means operable by the doors of said vehicle for locking said meter in registering position when a passenger or pay load is in said vehicle, and in non-registering position when the pay load or passenger has been discharged from the vehicle.

6. In combination with a vehicle having a compartment in which to carry a load, such as, goods, passengers and the like, for hire, doors for closing said compartment, and a meter for registering the amount due for the hire of said vehicle, of a movable floor in said compartment, means normally urging said floor to a no-load position, means operable by movement of said floor to start said meter in response to a load being placed thereon, and locking means operable by said doors when closed to lock the floor in a no-load position, when the compartment is empty, and to lock said floor in loaded position when a load is in the compartment.

7. In combination with a vehicle having a compartment in which to carry a load for hire, and doors for opening and closing said compartment, of a movable floor in said compartment having no-load and loaded positions, means operated by said floor adapted to control the starting and stopping of a tariff meter on said vehicle, and means operable by said doors when closed to lock the floor in one or the other of said positions.

8. A locking device comprising a plunger, having a sleeve at one end thereof, a locking member pivotally mounted on the sleeve and having an arm extending into said sleeve, a second plunger having one end extending into said sleeve and engaging said arm, and means yieldingly opposing movement of the second plunger into the sleeve of the first plunger.

9. In a mechanism for controlling the registering operations of a taximeter, in combination with a taximeter, means operable by the doors of a cab for starting the meter and means controlled by the absence or presence of a pay load in said cab for rendering said meter starting means inoperative when the cab is not loaded or vacant and for rendering said meter starting means operative to start the meter when the cab is loaded or occupied.

10. In combination with a vehicle having a tariff load compartment, a door for said compartment, and a tariff registering meter, of means controlled in response to the weight of a load in said compartment and the closure of said door for actuating said meter to running position and locking it in said running position.

In testimony whereof, we have hereunto set our names this 12th day of June, 1930.

WILLIAM EISENSCHMID.
LEROY NEWCOMB.